(12) United States Patent
Thottupurathu

(10) Patent No.: US 8,071,006 B2
(45) Date of Patent: Dec. 6, 2011

(54) POLY(TETRAFLUOROETHYLENE) ZEOLITE COMPOSITE AND METHODS

(75) Inventor: Gopakumar Thottupurathu, Overland Park, KS (US)

(73) Assignee: General Electric Company, Schenectady, NY (US)

( * ) Notice: Subject to any disclaimer, the term of this patent is extended or adjusted under 35 U.S.C. 154(b) by 163 days.

(21) Appl. No.: 12/190,233

(22) Filed: Aug. 12, 2008

(65) Prior Publication Data

US 2010/0038316 A1 Feb. 18, 2010

(51) Int. Cl.
*D02J 1/06* (2006.01)
*D02J 1/22* (2006.01)
*B29C 55/00* (2006.01)
*B29D 39/00* (2006.01)

(52) U.S. Cl. ........ 264/288.8; 264/288.4; 264/45.1; 210/502.1; 210/500.36

(58) Field of Classification Search .......... 210/490, 210/500.36, 500.27, 500.25, 502.1; 502/10; 95/45; 428/246, 307.7; 264/45.1, 288.4, 264/288.8; 55/523, 524; 429/33
See application file for complete search history.

(56) References Cited

U.S. PATENT DOCUMENTS

| | | | |
|---|---|---|---|
| 3,953,566 A * | 4/1976 | Gore | 264/505 |
| 4,153,661 A * | 5/1979 | Ree et al. | 264/120 |
| 4,637,990 A * | 1/1987 | Torobin | 502/10 |
| 4,810,381 A * | 3/1989 | Hagen et al. | 210/502.1 |
| 4,985,296 A * | 1/1991 | Mortimer, Jr. | 428/220 |
| 5,024,594 A * | 6/1991 | Athayde et al. | 442/67 |
| 5,147,539 A * | 9/1992 | Hagen et al. | 210/198.3 |
| 5,814,405 A * | 9/1998 | Branca et al. | 428/311.51 |
| 5,849,235 A * | 12/1998 | Sassa et al. | 264/288.8 |
| 5,871,650 A * | 2/1999 | Lai et al. | 210/653 |
| 5,882,517 A * | 3/1999 | Chen et al. | 210/496 |
| 5,919,583 A * | 7/1999 | Grot et al. | 429/494 |
| 6,582,495 B2 * | 6/2003 | Chau et al. | 95/45 |
| 6,608,129 B1 * | 8/2003 | Koloski et al. | 524/403 |
| 6,709,644 B2 | 3/2004 | Zones et al. | |
| 6,767,384 B1 * | 7/2004 | Vu et al. | 95/45 |
| 7,077,891 B2 | 7/2006 | Jaffe et al. | |
| 7,314,565 B2 * | 1/2008 | Sabottke et al. | 210/640 |
| 7,767,745 B2 | 8/2010 | Thottupurathu | |
| 7,812,081 B2 | 10/2010 | Thottupurathu | |
| 2006/0034757 A1* | 2/2006 | Yan et al. | 423/707 |
| 2010/0038316 A1* | 2/2010 | Thottupurathu | 210/650 |

* cited by examiner

*Primary Examiner* — Ana Fortuna

(74) *Attorney, Agent, or Firm* — Sutherland Asbill & Brennan LLP

(57) ABSTRACT

The present application thus provides a composite composition comprising PTFE and zeolite. According to another aspect, the present application provides a method for making a composite article comprising bonding zeolite to PTFE. According to still yet another aspect of the present application, a method for separating components of the mixture comprising contacting the mixture with a composite composition comprising PTFE and zeolite is disclosed.

11 Claims, 1 Drawing Sheet

POLY(TETRAFLUOROETHYLENE) ZEOLITE COMPOSITE AND METHODS

STATEMENT REGARDING FEDERALLY SPONSORED RESEARCH OR DEVELOPMENT

This invention was made with Government support under contract number W911QY-05-C-0102 awarded by US Army Natick Soldier Research Development and Engineering Center, Natick, Mass. The Government has certain rights in this invention.

TECHNICAL FIELD

The present application relates to composite compositions and more particularly relates to poly(tetrafluoroethylene) composite compositions.

BACKGROUND OF THE INVENTION

Generally described, poly(tetrafluoroethylene) (PTFE) has a high degree of chemical inertness, thermal stability, and hydrophobicity. These features make PTFE useful in many applications. For example, PTFE membranes are useful in processes such as filtration and separation. It would be desirable, however, to add other functionality to PTFE for some applications. Unfortunately, the chemical inertness of PTFE makes it very difficult to modify its properties.

What is desired, therefore, is a composition that has one or more attributes of PTFE, but other functionality as well, such as hydrophobicity, stereo selectivity, nanoporosity, adsorption, ion exchange characteristics, and/or catalytic properties, and is useful in applications such as filtration and separation.

BRIEF DESCRIPTION OF THE INVENTION

The present application thus provides a composite composition comprising PTFE and zeolite. According to another aspect, the present application provides a method for making a composite article comprising bonding zeolite to PTFE. According to still yet another aspect of the present application, a method for separating components of the mixture comprising contacting the mixture with a composite composition comprising PTFE and zeolite is disclosed.

DETAILED DESCRIPTION OF THE INVENTION

Figure 1:
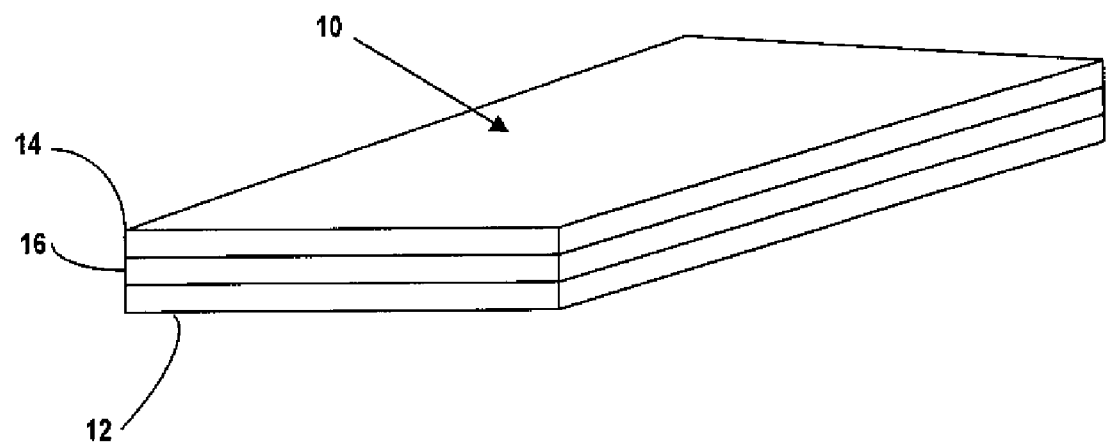
FIG. 1 is a perspective view of a PTFE/zeolite membrane made in accordance with an embodiment of this invention.

As summarized hereinabove, the present application provides a composite composition comprising PTFE and zeolite and methods for making and using such compositions. The composite material comprising PTFE and zeolite may combine the chemical inertness, thermal stability and/or super hydrophobicity of PTFE with the hydrophobicity, stereoselectivity, nanoporosity, adsorption, ion exchange characteristics, and/or catalytic properties of zeolite.

According to an embodiment of the present invention, the composite composition comprises PTFE and zeolite and the PTFE and zeolite are bonded together. According to embodiments of this invention, there are different methods for bonding the PTFE and zeolite together. According to a certain embodiment, PTFE and zeolite may be bonded together by an ion exchange reaction. For example, according to a particular embodiment, the PTFE has a surface and the zeolite is bonded to the PTFE surface. According to a further embodiment, the composite composition may further comprise a binder for bonding the PTFE and zeolite together. For example, the binder may be coated on the PTFE and binder in zeolite may be bonded together by ion exchange reaction, according to a particular embodiment. According to yet another embodiment, the binder may be bonded to a surface of the PTFE and also bonded to the zeolite by intercalation.

According to certain embodiments, the PTFE may comprise expanded PTFE which is a microporous air permeable membrane produced from PTFE fine powder supplied by companies such as DuPont (under their trademark Teflon®) and Daikin America Inc. Particular embodiments may comprise Dupont 60A, Dupont 601A, Dupont 603A, or Daikin F107 PTFE. The membrane may retain the same chemical attributes of the raw material PTFE such as chemical inertness, heat resistance, weather resistance, durability, hydrophobicity, and low coefficient of friction, but is also breathable. According to a certain embodiment, the membrane may have a microstructure comprising a 3-dimensional array of "nodes" connected by smaller "fibers" of PTFE and voids between the fibers. In a certain embodiment, the membrane volume is about 90% void.

According to certain embodiments, the binder may comprise an organic or inorganic material capable of bonding the PTFE and zeolite together. For example, the binder material may comprise a polymer material capable of bonding the PTFE and zeolite together. As a further example, the polymer may comprise a polymer such as polyvinyl alcohol. Other suitable binders include fluoroalkyl acrylate copolymer, polyacrylic acid, and the like.

According to another embodiment, the method of bonding the PTFE and zeolite together may comprise modifying a surface of the PTFE by making the PTFE surface capable of undergoing an ion exchange reaction and thereafter reacting the zeolite with the PTFE surface by ion exchange reaction. According to a certain embodiment, the surface of the PTFE may be modified by chemical etching, plasma and E-beam irradiation. Furthermore, according to another embodiment, the PTFE/zeolite composite may be made by coating at least a portion of the PTFE surface with a binder capable of ion exchange reaction with zeolite or ion exchange reaction with both the modified PTFE surface and zeolite. Examples of suitable binders include polyvinyl alcohol, polyacrylic acid, fluoroalkyl acrylate copolymer. Thus, according to a particular embodiment, the method of bonding the PTFE and zeolite may further comprise bonding the binder and zeolite with an ion exchange reaction and then coating the PTFE with the binder and zeolite.

According to certain embodiments, the binder and/or zeolite may be deposited on the PTFE by a variety of methods including but not limited to electrostatic deposition, powder coating, spraying, immersion, or drawdown such as with a doctor blade. According to a particular embodiment, zeolite may be bonded to a PTFE membrane having a structure as described hereinabove by applying to the PTFE membrane a mixture of zeolite powder, binder, and a solvent, and drying the PTFE membrane. In a particular embodiment, the solvent may comprise water and an alcohol, such as isopropyl alcohol for example, and the binder may comprise polyvinyl alcohol. More particularly, according to an embodiment, the zeolite coating solution may comprise about 55 parts by weight water, about 65 parts by weight isopropyl alcohol, about 0.1 to about 2 parts by weight polyvinyl alcohol, and about 0.1 to about 20 parts by weight zeolite powder, and the PTFE membrane may be dipped in the zeolite coating solution, drawn down, and dried by passing through a hot air circulated oven at a temperature of about 350° F. and line speed of about 6 ft/min.

According to still another embodiment, the PTFE and zeolite may be in powder form and a method for bonding the zeolite to the PTFE may comprise mixing the powders to form an extrudable mixture and then extruding the extrudable mixture to form a sheet. The sheet may further be biaxially stretched to form a membrane according to another embodiment of this invention.

According to an embodiment, a method of making a PTFE/zeolite membrane comprises mixing about 75 to about 85 parts by weight PTFE powder and about 15 to about 25 parts by weight of a lubricant in a blender, wicking the PTFE/lubricant mixture at a temperature of about 90° F. for about 18 hours, optionally mixing in any desired additives with the PTFE/lubricant mixture, pressing the PTFE/lubricant mixture into a cylindrical preform, extruding the preform into a tape, passing the tape through hot calendar rolls at a temperature of about 300° F. to evaporate the lubricant and obtain a tape thickness of about 4 to about 20 mils, biaxially stretching the tape to form a membrane comprising fibers with voids in between the fibers, and stabilizing the membrane by applying heat at a temperature of about 650° F. to about 750° F. According to certain embodiments, the lubricants may be Isopar™ K, Isopar™ M, or Isopar™ G isoparaffinic solvents available from Exxon Mobile.

Thus, according to the embodiments of this invention, articles comprising PTFE and zeolite may be made. According to a certain embodiment illustrated in FIG. 1, a membrane 10 comprises a layer of PTFE 12 and a layer of zeolite 14 with the layer of zeolite 14 bonded to at least a portion of the layer of PTFE 12 with a binder 16. The zeolite 14 may be bonded to the PTFE 12 by many of the methods described hereinabove. According to particular embodiments, such a membrane 10 may comprise PTFE in an amount of about 80 to about 99% by weight of the membrane, or about 80 to about 90% by weight, or 90 to about 99% by weight or 95 to about 99% by weight, and zeolite in an amount from about 1 to about 20% by weight of the membrane, or about 10 to about 20% by weight, or about 1 to about 10% by weight, or about 1 to about 5% by weight. According to embodiments comprising a binder, the binder may be present in an amount from about 2 to about 5% by weight of the membrane, or about 1 to about 6% by weight or about 3 to about 5% by weight.

According to particular embodiments, the PTFE and/or zeolite may be in powder form and, according to a certain embodiment, the zeolite powder comprises nanoparticles and is microporous. In particular, according to a certain embodiment, the zeolite powder may have an average particle size of about 1 to about 5 microns and/or may have a porosity of about 65% to about 85%.

According to another embodiment, a catalytic article comprising PTFE, zeolite, and a catalyst or catalyst precursor supported by the zeolite is provided. According to certain embodiments, the zeolite and PTFE may be bonded together according to methods described hereinabove. According to a certain embodiment, the catalyst or catalyst precursor may be supported by the zeolite or the binder, or both. According to certain embodiments, suitable catalysts include inorganic decontaminating agents such as silver ions or organic nerve agent decontamination agents such as organophosphorus acid (OPA) anhydrolases (enzymes).

The catalysts and other chemically active agents may be deposited into the PTFE/zeolites composites by different methods. Metal ions may be deposited by physical or chemical vapor deposition. Organic decontamination or catalytic agents may be deposited by wet process-dipping, spraying etc. The nanopowder of metals and inorganic decontaminating agents may be incorporated into the membrane by mixing and extrusion.

According to embodiments of this invention, PTFE/zeolite compositions and articles made therewith are useful in a variety of applications including but not limited to separation operations. Thus, according to an embodiment of the present invention, a method of separating components of a mixture comprises contacting the mixture with a composition or article comprising PTFE in zeolite. Compositions and articles described hereinabove make suitable embodiments for separation of materials. In particular, certain separation applications include: filtration; water purification, including but not limited to removal of toxins such as heavy metals like cadmium, mercury, and the like; gas separation; decontamination of chemical and biological agents; separating water carbon dioxide, sulfur dioxide, and the like, from low grade natural gas streams; liquid/liquid separation; proton exchange membranes for fuel cells [Zeolite makes PTFE membrane positively charged and can be used as thermally stable proton exchange membrane]; removal of heavy metals [cage-like structure of zeolites helps to remove lead, mercury, cadmium, arsenic and other heavy metals]; drug synthesis [PTFE zeolites based catalyst membrane reactor-zeolites can promote a diverse range of catalytic reactions including acid-base and metal induced reactions; zeolites can also be acid catalysts and can be used as supports for active metals or reagents]; toxic nerve agent decontamination [The micro-porous structure of zeolites allows using it as carrier for decontamination agents for neutralizing toxic substance]; and immobilization of enzymes and drugs [PTFE zeolites membrane act as carrier for enzymers and drugs]. Other applications of PTFE/zeolite compositions according to embodiments of this invention include apparel, microventing, catalyst assisted reactions by incorporating catalyst into the zeolite, and electronic and optical materials by hosting electronically active guest materials on the zeolite such as metals, semiconductors, and conductive polymer nano-particles.

The present invention is further illustrated below by examples which are not to construed in any way as imposing limitations upon the scope of the invention. On the contrary, it is to be clearly understood that resort may be had to various other embodiments, modifications, and equivalents thereof which, after ready the description therein may suggest themselves to those skilled in the art without departing from the scope of the invention and the appended claims.

Example 1

A mixture comprising 80% by weight DuPont 601 PTFE resin fine powder and 20% by weight Isopar™ K isoparaffinic solvent available from Exxon Mobile was blended using a V blender at ambient conditions for about 30 min. The PTFE resin/Isopar™ mix was wicked at 90° F. for 24 hours. The wicked PTFE/Isopar™ mix was blended with zeolite powder, available from Sigma-Aldrich Pty, Ltd., using a V blender for about 15 min. The zeolite powder was added to the wicked PTFE/Isopar™ mix in an amount such that weight ratio of zeolite powder to PTFE was 1/19 (5% by weight zeolite powder and 95% by weight PTFE). The PTFE resin/Isopar™/zeolite mixture was shaped into cylindrical form (preform) by pressure of 150 psi using a billet press. The preform was extruded into a tape at a temperature 80° F. using a ram extruder. The Isopar™ was removed from the tape by passing the tape through series of hot calendar rolls at a temperature of 200° F. The tape was stretched biaxially at a temperature range from 300 to 800° F. to form a porous PTFE membrane (stretched 2 times in the machine direction and 8 times in the transverse direction). The microstructure of PTFE membrane was stabilized by applying heat at temperature of 680° F.

The membrane was tested and it was found that the zeolite powder additive dispersed uniformly within PTFE matrix and locked in the microstructure.

Example 2

A mixture comprising 78% by weight DuPont 603 PTFE resin fine powder and 22% by weight Isopar™ M isoparaffinic solvent available from Exxon Mobile was blended using a V blender at ambient conditions for about 20 min. The PTFE resin/Isopar™ mix was wicked at 110° F. for 48 hours. The wicked PTFE/Isopar™ mix was blended with zeolite powder, available from Sigma-Aldrich Pty, Ltd., using a V blender for about 30 min. The zeolite powder was added to the wicked PTFE/Isopar™ mix in an amount such that weight ratio of zeolite powder to PTFE was 1/9 (10% by weight zeolite powder and 90% by weight PTFE). The PTFE resin/Isopar™/zeolite powder was shaped into cylindrical form (preform) by applying pressure of 100 psi using a billet press. The preform was extruded into a tape at a temperature 110° F. using a Ram extruder. The Isopar™ was removed from the tape by passing the tape through series of hot calendar rolls at a temperature of 250° F. The tape was stretched biaxially at a temperature range from 300 to 800° F. to form a porous PTFE membrane (stretched 5 times in the machine direction and 12 times in the transverse direction). The microstructure of PTFE membrane was stabilized by applying heat at a temperature of 720° F.

The membrane was tested and it was found that the zeolite powder additive dispersed uniformly within PTFE matrix and locked in the microstructure.

It should be understood that the foregoing relates only to the preferred embodiments of the present application and that numerous changes and modifications may be made herein without departing from the general spirit and scope of the invention as defined by the following claims and the equivalents thereof.

I claim:

1. A method for making a composite article consisting essentially of:
    mixing a zeolite, a poly(tetrafluoroethylene), and a lubricant to form a mixture;
    pressing the mixture to form a preform;
    extruding the preform into a tape or sheet;
    stretching the tape or sheet biaxially; and
    stabilizing the biaxially stretched tape or sheet by applying heat, wherein the stabilizing step occurs at a temperature of about 650° F. to about 750° F.

2. The method of claim 1, wherein the poly(tetrafluoroethylene) is a powder.

3. The method of claim 1, wherein the preform is cylindrical.

4. The method of claim 1, wherein the preform is formed by pressure.

5. The method of claim 4, wherein the pressure is about 150 psi.

6. The method of claim 1, wherein the extrusion is performed at a temperature of about 80° C.

7. The method of claim 1, wherein the biaxial stretching of the tape or sheet occurs at a temperature ranging from about 300° F. to about 800° F.

8. The method of claim 1, wherein the lubricant is an isoparaffinic solvent.

9. The method of claim 1, wherein the calendar rolls are about 300° F.

10. The method of claim 1, wherein the tape or sheet is about 4 to about 20 mils thick prior to biaxially stretching the tape or sheet.

11. A method for making a composite article consisting essentially of:
    mixing a zeolite, a poly(tetrafluoroethylene), and a lubricant a mixture;
    pressing the mixture to form a preform;
    extruding the preform into a tape or sheet;
    passing the tape or sheet through calendar rolls to evaporate the lubricant;
    stretching the tape or sheet biaxially; and
    stabilizing the biaxially stretched tape or sheet by a applying heat, wherein the stabilizing step occurs at a temperature of about 650° F. to about 750° F.

* * * * *